United States Patent [19]

Henriques

[11] 4,171,199
[45] Oct. 16, 1979

[54] FRUSTOCONICAL BURNER CAN ASSEMBLY

[76] Inventor: Joseph Henriques, 24 Hidden Brook Dr., Brookfield, Conn. 06804

[21] Appl. No.: 837,215

[22] Filed: Sep. 27, 1977

[51] Int. Cl.² ............................................. F23D 15/00
[52] U.S. Cl. .................................. 431/351; 431/265; 239/424.5
[58] Field of Search ................ 431/265, 351, 352, 10; 239/424.5

[56] References Cited

U.S. PATENT DOCUMENTS

| | | | |
|---|---|---|---|
| 1,953,483 | 4/1934 | Higinbotham | 431/265 |
| 2,090,566 | 8/1937 | Andler | 239/406 |
| 2,090,567 | 8/1937 | Andler | 239/406 |
| 2,109,027 | 2/1938 | McCullough | 239/406 |
| 2,502,664 | 4/1950 | Nest | 431/265 |
| 2,665,748 | 1/1954 | Cornelius | 431/265 |
| 2,790,490 | 4/1957 | Smith | 239/406 |
| 3,003,548 | 10/1961 | Sanders et al. | 239/424 |
| 3,211,207 | 10/1965 | Luft | 239/406 |
| 3,360,929 | 1/1968 | Drewry | 431/351 |
| 3,404,844 | 10/1968 | Walsh | 239/406 |
| 3,406,002 | 10/1968 | Martin | 431/265 |
| 3,409,231 | 11/1968 | Oehlerking | 239/406 |
| 3,490,858 | 1/1970 | Fletcher | 431/265 |
| 3,493,180 | 2/1970 | Walsh | 239/406 |
| 3,529,917 | 9/1970 | Hindenlang | 431/351 |
| 3,574,508 | 4/1971 | Rothhaar et al. | 431/351 |
| 3,632,286 | 1/1972 | Kegan et al. | 431/284 |
| 3,694,135 | 9/1972 | Dancy et al. | 431/265 |
| 3,733,169 | 5/1973 | Lefebvre | 431/265 |
| 3,869,243 | 3/1975 | Creuz | 431/90 |
| 3,881,863 | 5/1975 | Creuz | 432/222 |
| 3,923,251 | 12/1975 | Flournoy | 239/402.5 |
| 4,012,189 | 3/1977 | Vogt et al. | 431/353 |

FOREIGN PATENT DOCUMENTS 386159  12/1923  Fed. Rep. of Germany ........ 239/424.5

*Primary Examiner*—Carroll B. Dority, Jr.
*Attorney, Agent, or Firm*—Mattern, Ware, Davis & Stoltz

[57] ABSTRACT

A burner can assembly for retrofitting a conventional gun type fuel burner to preheat primary air and effect a fuel/air mix within a frustoconical mixing zone and project a generally cylindrical flame pattern.

9 Claims, 3 Drawing Figures

4,171,199

FRUSTOCONICAL BURNER CAN ASSEMBLY

BACKGROUND OF THE INVENTION

The purpose of the present invention is to increase the combustion efficiency of a gun type burner employing a liquid fuel atomizing nozzle discharging a conical fuel spray. Exemplary of a conventional fuel nozzle which may be employed with a standard 4" diameter air blast tube as original equipment or retrofit of a conventional gun type burner is a 0.75 g.p.h. nozzle discharging an 80° spray pattern. The improved gun burner may be employed with a wide variety of conventional heating systems such as, for example, a Lux-air hot air furnace, model OU1OOMF manufactured by Lux-Air Corporation of Elyria, Ohio.

Conventional gun burners, although employing atomizing fuel injectors having conical spray patterns, usually introduce primary air in such fashion that mixing takes place and upstream combustion initiates within a generally cylindrical zone centrally of the blast tube. This by virtue of the manner in which primary air is introduced. Thus, whether most of the required primary air be introduced along a swirling path concentric with the fuel injector to intersect the conical fuel spray and entrain the same or the primary air stream be split to include mixing components both projecting the fuel spray downstream and introducing air radially inwardly through a perforated, generally cylindrical portion of a burner can, the result is the same; "choking" or constriction of the mixing zone and flame pattern. Even with such a choking effect it is still possible to achieve substantially complete mixing albeit over a somewhat longer distance and requiring a greater excess of air over a theoretical stoichiometric mix than would be required if the mixing zone were less constricted. Although, from the latter, it might appear immaterial whether a stoichiometric mix takes place over a greater or lesser axial distance and/or requiring a greater or lesser excess of primary air; such is not the case. Significant improvements result when, other factors being equal, the primary air requirement can be reduced. Thus where less air is required to achieve the same mixing; the extra energy requirements to heat and move the extra air are eliminated and, with less air flow requirement, air velocity is accordingly reduced thus increasing residence time of the combustion process, increasing heat exchange time with the heating medium and reducing stack temperatures.

While some of the theoretical considerations underlying the dramatic increase in combustion efficiency of the burner assembly herein disclosed as compared with various conventional assemblies are not fully understood, the empirical results of independent comparative testing are fully documented.

SUMMARY OF THE INVENTION

Empirical data indicates that the improved results derive, primarily, from an increase in fuel/air mixing efficiency as evidenced by reduced primary air requirement to achieve a stoichiometric mix. The improved mixing efficiency appears, in turn, to derive from the establishment and maintenance of a shaped, internally turbulent fuel/air mixing zone which is rotationally static and exhibits maximal surface are obtainable within the constraints imposed by a conventional injector and standard blast tube.

A secondary contribution to increased efficiency appears to be in the formation and projection of a generally cylindrically shaped flame across the associated fire pot for maximum heat exchange surface area and incandescing the opposite fire pot wall.

For a given conical fuel spray pattern, the mixing zone shape exhibiting maximum surface area for air admixture would be a cone frustrum axially coextensive with the projected spray pattern. The burner assembly therefore includes a burner can to admit all of the required primary air from a frustoconed surface concentric with the projected fuel spray pattern through perforations sized and arrayed to present to the fuel spray pattern a concentric, rotationally static air curtain substantially coextensive therewith to establish a substantially frustoconical mixing zone. The continuing establishment of this mixing zone may be thought of as a continuing merger of rotationally static, fructoconical fuel and air curtains.

The frustoconical mixing zone is maintained in a constant state of internal turbulence produced by primary air entering the mixing zone generally normal to the frustoconical zone and immediately collapsing in the downstream direction, appearing as tumbling flame jets, to fill the reduced pressure areas between burner can perforations. The turbulent mixing effect of the tumbling flame jets is thought to play a significant role in the improved mix. It therefore follows that maximization of this effect, within limits of stoichiometric maintenance, will be had if the effect is maintained throughout the frustoconical mixing zone extending from immediately adjacent the fuel nozzle to adjacent the internal periphery of the blast tube. For this reason the size and positioning of the burner cone perforations are critical but only within rather wide ranges consistent with the maintenance of the dynamic integrity of the mixing zone. Considering any finite region within the mixing zone the force resolutions defining rate and direction of gaseous movement will be a function of burner cone angle; burn rate; flame front; fuel injection pressure, angle and volume; and commingling pressure, volume, temperature and velocity of primary air. For a given installation with a known burner cone angle and known fuel injection parameters the sizes and position of the perforations may be determined empirically for a given air blower setting such that the resultants of the aforesaid force resolutions define a rotationally static, generally frustoconical mixing zone.

It is also important that, at the downstream end of the mixing zone, the flame be shaped and projected in generally cylindrical form. For this reason, the extreme downstream perforations are arranged in a closely grouped circular pattern to prevent spreading of the flame as it enters the fire pot.

Since the maintenance of the concentricity of the fuel spray pattern and air curtain throughout their substantially coextensive frustoconical lengths is important to the improved mixing over a shorter axial distance it follows that the pattern of burner cone perforation must be substantially symmetrical about the axis of the injector.

Similarly, permissible variations in axial positioning of the burner can relative to the injector are, as would be expected, quite small as on the order of ±1/16". Ideally the fuel spray pattern and burner can are exactly concentric and tests indicate that while some variation is permissible the stability of the aforedescribed frustoconical mixing zone deteriorates rapidly if the concentric relationship is not maintained.

It is not understood precisely why the improved combustion efficiency depends upon the merger of rotationally static fuel and air curtains but it is theorized that the vortex created by swirling the incoming air adds to the constricting effect of the mixing chamber and, perhaps, results in a coalesence of atomized fuel droplets prior to their mixing and vaporization.

DESCRIPTION OF THE PREFERRED EMBODIMENT

Figure 1:
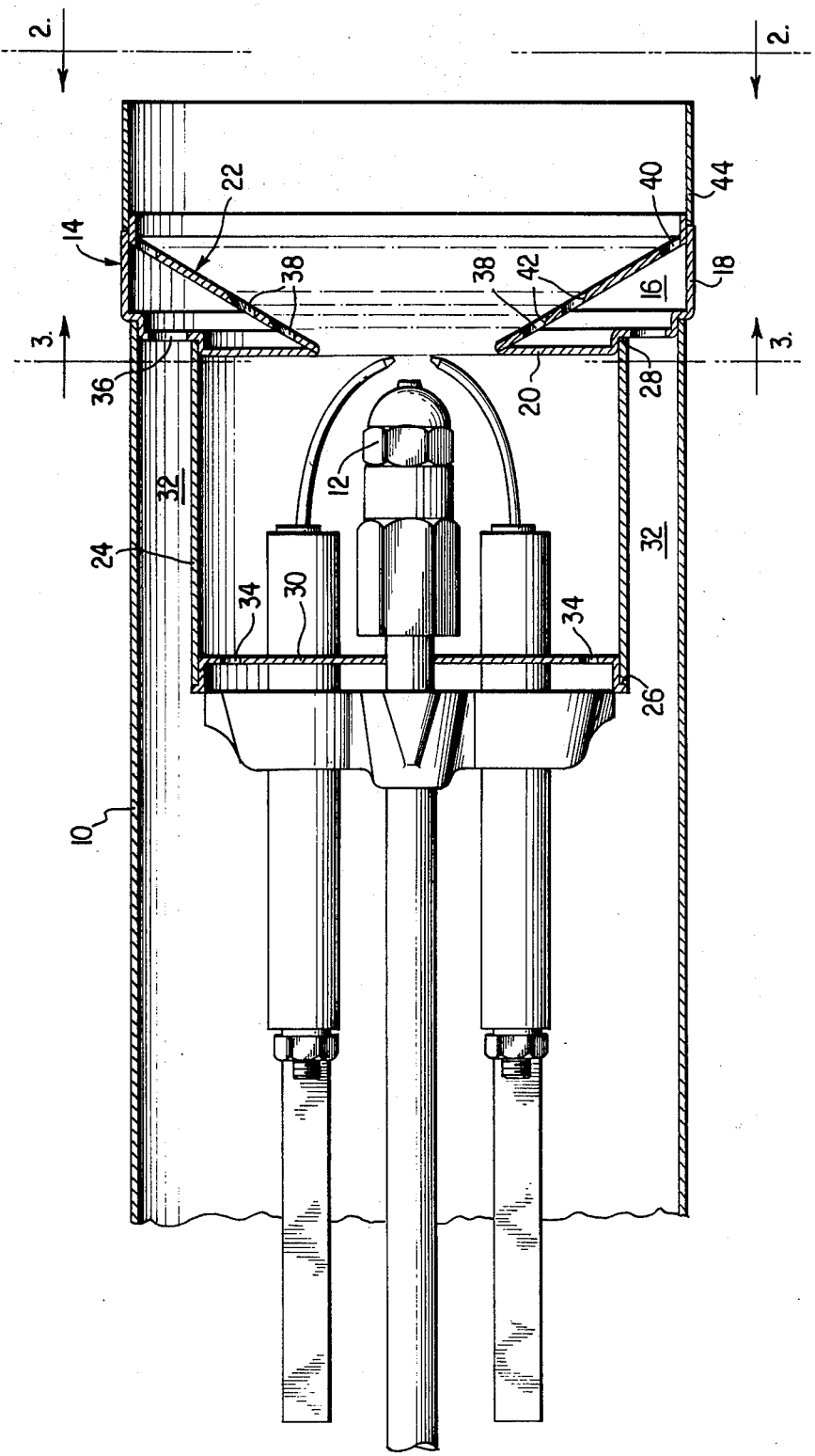
FIG. 1 is a partly sectioned side view, drawn to actual size, of the downstream end of a gun type burner incorporating the burner can assembly of the present invention.
Figure 3:
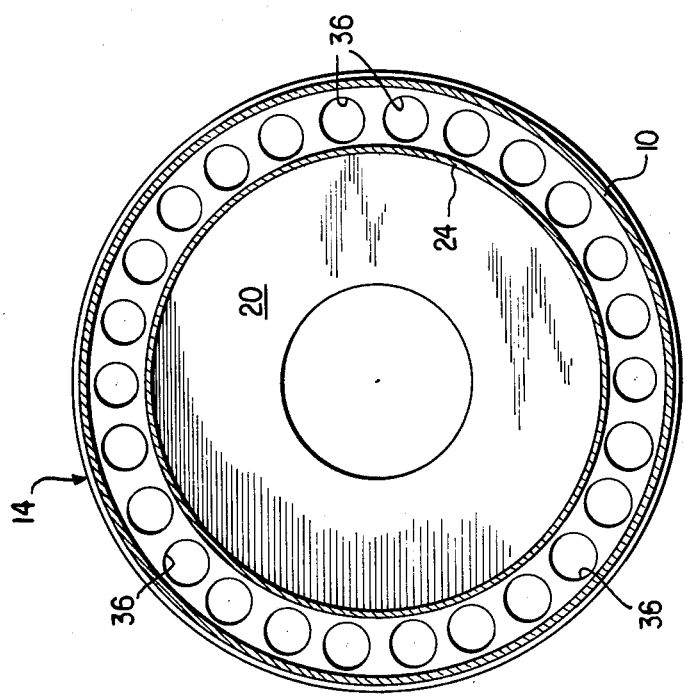
FIG. 3 is a downstream view of the burner can assembly as viewed from line 3—3 of FIG. 1.
Figure 2:
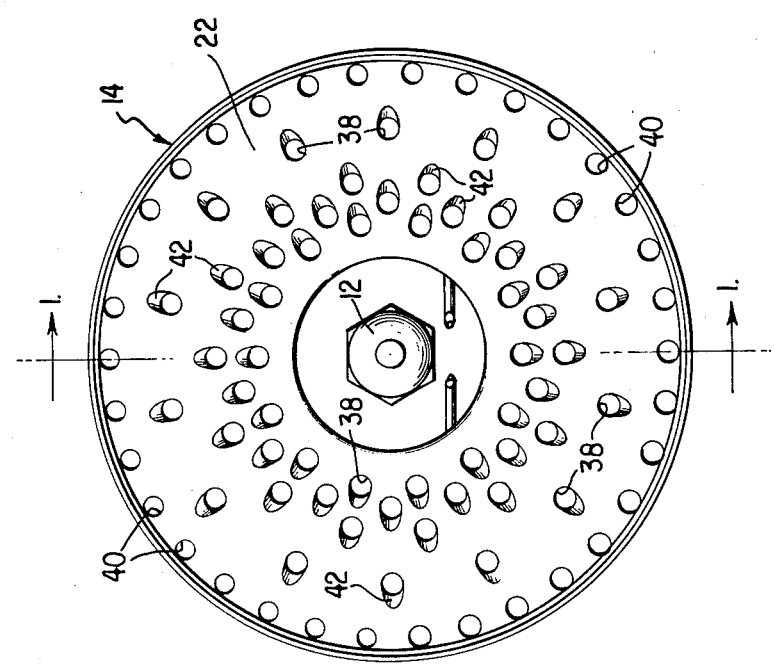
FIG. 2 is an upstream view of the burner can as from line 2—2 of FIG. 1.

In FIG. 1 is illustrated the downstream end of a conventional blast tube 10 supplied with primary air from a standard blower assembly, not shown, and a conventional atomizing injector nozzle 12 emitting a conical fuel spray controlled by a standard flame detector all as commonly employed in a Lux-air hot air furnace, model OU1OOMF manufactured by Lux-Air corporation and which is herein illustrated as retrofitted with a frustoconical burner can assembly 14.

Burner can assembly 14 comprises a preheating plenum chamber 16 defined by a peripheral wall 18, back wall 20 and a frustoconical front wall, or burner can 22, whose included cone angle is selected to be slightly larger than the conical fuel spray angle emitted from injector 12.

The retrofit of a conventional gun burner is completed by securement of burner assembly 14 to the downstream end of blast tube 10, as by a press fit or the like, and similar securement of imperforate tubular wall 24 in bridging relation between like peripheral shoulders 26, 28 on injector support disc 30 and back wall 20 to define a bypass 32.

Except for air passage through four small vent apertures 34 in support disc 30 all of the air delivered to blast tube 10 is directed, via bypass 32, to a symmetrical, circumferential array of inlet passages 36 in back wall 20 whose aggregate cross-section exceeds the aggregate cross-section of the burner can apertures. The burner can apertures, consisting of mixing apertures 38 and flame shaping and directing apertures 40, are so sized and arrayed that the resultants of the aforementioned force resolutions define a generaly frustoconical mixing zone. It is thus apparent that the array is desirably symmetrical about the burner can axis. In order to insure proportionate net mass flow from the radially inner, smaller volume portion of the plenum chamber it is necessary that the ratio of perforated to non-perforated frustoconed surface area be maximal at the smaller end and decrease as the larger end is approached until the extreme downstream end of the burner can is reached whereat the ratio again increases due to the presence of flame shaping and directing apertures 40. The burner can apertures are appropriately sized for a given installation to insure a proportional reentry air flow within the plenum chamber from peripheral inlet passages 36 to the radially innermost apertures 38.

In the illustrated embodiment the foregoing is achieved by providing a like number of mixing apertures 38 in each of four concentric circular arrays to produce the decreasing downstream perforated to non-perforated ratio. At the extreme downstream end of the frustoconical burner can, flame shaping apertures 40 are arranged generally in line with inlet passages 36 so that the flame shaping air undergoes less reentrant flow and preheating within the plenum chamber and exits at a greater velocity than is the case of the air exiting mixing apertures 38. It has been found that the frustoconical mixing zone may be maintained somewhat closer to the frustoconed surface of burner can 20, without substantial carbon deposition, if the downstream peripheries of mixing apertures 38 are relieved as at 42. The flame shaping effect is somewhat enhanced by the addition of a short extension hood 44 which may comprise an integral part of the burner can assembly 14.

Retrofit of the aforementioned furnace construction employing a 0.75 g.p.h. nozzle discharging a spray angle whose included angle is 80° initiating 0.25" upstream of the top of the illustrated frustoconical burner can whose included angle is 120° and with a primary air flow of between 20 and 24 CFM exiting the apertures as sized and arrayed herein resulted in an 8% increase in combustion efficiency.

What is claimed is:

1. In a gun type burner having a fuel injector for discharging a conical spray pattern centrally of a surrounding blast tube and means for supplying pressurized air to said tube, the improvement comprising;

a perforated, frustoconical burner can surrounding, and concentric with, the downstream end of said injector spray pattern;

said burner can comprising the downstream wall of a preheating plenum chamber surrounding said injector for defining, with said conical spray pattern, a rotationally static frustoconical fuel/air mixing zone;

said plenum chamber including a plurality of upstream inlet passages for admitting substantially the entire air flow through said blast tube to said plenum chamber and whose aggregate cross-section exceeds that of the burner can perforations;

means for directing substantially the entire flow of air in said blast tube through said upstream passages;

said burner can perforations being symmetrically disposed about the burner can axis;

and said frustoconical burner can exhibiting a perforated to non-perforated surface area ratio decreasing from a maximal adjacent the smaller upstream end thereof to a minimal adjacent the downstream end thereof and then increasing, at the extreme downstream end thereof, to a value intermediate said maximal and minimal ratios.

2. The burner of claim 1 wherein the burner can perforations at said extreme downstream end thereof comprise flame shaping perforations arranged in a circular array whose diameter approaches the internal diameter of said blast tube to shape and project a generally cylindrical flame.

3. The burner of claim 2 wherein said plenum inlet passages are arranged in a circular array whose diameter approximates that of the aforesaid flame shaping array;

and the remainder of said burner can perforations, upstream of said flame shaping array, comprising mixing perforations arranged in a plurality of circular arrays having substantially smaller diameters than said inlet passage array whereby air traversing said plenum chamber to exit said mixing perforations follows a reentrant flow path.

4. A burner can assembly for retrofitting a liquid fuel gun burner whose fuel injector discharges a conical spray pattern centrally of a blast tube, comprising;

a perforated, frustoconical burner can comprising the downstream wall of an annular, preheating plenum chamber adapted for positionment in said blast tube in surrounding relation to said injector for defining, with said conical spray, a rotationally static fuel/air mixing zone;

said plenum chamber including a plurality of upstream inlet passages for admitting substantially the entire air flow through said blast tube to said plenum chamber and whose aggregate cross-section exceeds that of the burner can perforations;

means for directing substantially the entire flow of air in said blast tube through said upstream passages;

said burner can perforations being symmetrically disposed about the burner can axis;

and said frustoconical burner can exhibiting a perforated to non-perforated surface area ratio decreasing from a maximal adjacent the smaller upstream end thereof to a minimal adjacent the downstream end thereof and then increasing, at the extreme downstream end thereof, to a value intermediate said maximal and minimal ratios.

5. The burner can assembly of claim 4 wherein the burner can perforations at said extreme downstream end thereof comprise flame shaping perforations arranged in a circular array whose diameter approaches the internal diameter of said blast tube to shape and project a generally cylindrical flame.

6. The burner can assembly of claim 5 including an annular hood extending downstream from the base of said frustoconical burner can to augment the shaping of said flame.

7. The burner can assembly of claim 6 wherein said plenum inlet passages are arranged in a circular array whose diameter approximates that of the aforesaid flame shaping array;

and the remainder of said burner can perforations, upstream of said flame shaping array, comprising mixing perforations arranged in a plurality of circular arrays having substantially smaller diameters than said inlet passage array whereby air traversing said plenum chamber to exit said mixing perforations follows a reentrant flow path.

8. The burner can assembly of claim 7 wherein the downstream wall of each of said mixing perforations is relieved in the downstream direction.

9. A method of increasing the fuel/air mixing efficiency in a gun-type oil burner having a fuel injector for discharging a conical fuel spray pattern centrally of a central blast tube and having means for supplying pressurized air to said blast tube, comprising the steps of:

(1) directing substantially the entire flow of air in the blast tube through upstream inlet passages of a plenum chamber;

(2) preheating the air in the plenum chamber; and (3) generating rotationally static air curtains in the vicinity of the conical fuel spray pattern by forcing the air from the plenum chamber through a perforated frustoconical burner can surrounding, and concentric with, the downstream end of the injector fuel spray pattern, and forming the downstream wall of the plenum chamber, the perforations in the burner can being symmetrically disposed about the burner can axis and the perforated to non-perforated surface area ratio of the burner can decreasing from a maximal adjacent to the smaller upstream end thereof to a minimal adjacent to the downstream end thereof and then increasing, at the extreme downstream end thereof, to a value intermediate said maximal and minimal ratios.

* * * * *